United States Patent
Brosseuk

(10) Patent No.: US 8,789,780 B2
(45) Date of Patent: Jul. 29, 2014

(54) METHOD FOR EXTRACTING HEAVY METALS FROM HARD ROCK AND ALLUVIAL ORE

(71) Applicant: Raymond Brosseuk, Revelstoke (CA)

(72) Inventor: Raymond Brosseuk, Revelstoke (CA)

( * ) Notice: Subject to any disclaimer, the term of this patent is extended or adjusted under 35 U.S.C. 154(b) by 0 days.

(21) Appl. No.: 13/662,383

(22) Filed: Oct. 26, 2012

(65) Prior Publication Data
US 2014/0117124 A1    May 1, 2014

(51) Int. Cl.
*B02C 19/00* (2006.01)
*B02C 13/00* (2006.01)

(52) U.S. Cl.
USPC ......... 241/74; 241/20; 241/24.13; 241/24.25; 241/81; 241/91; 241/200

(58) Field of Classification Search
CPC  B02C 19/0006; B02C 19/0056; B02C 23/12; B02C 13/284; A01F 29/005; B03D 1/02; B29B 17/02; B03B 9/061; C22B 7/005; A22C 17/04
USPC ............ 241/20, 24.13, 24.25, 74, 81, 91, 200
See application file for complete search history.

(56) References Cited

U.S. PATENT DOCUMENTS

| | | | |
|---|---|---|---|
| 652,900 A | 7/1900 | Postlethwaite | |
| 1,401,769 A * | 12/1921 | Godfrey | 204/222 |
| 1,861,578 A | 6/1932 | Munro | |
| 2,057,338 A | 10/1936 | Malke | |
| 2,992,740 A | 7/1961 | Phippen | |
| 3,815,737 A | 6/1974 | Katter | |
| 4,178,238 A * | 12/1979 | Harris | 209/270 |
| 4,440,637 A | 4/1984 | Smit et al. | |
| 4,525,270 A | 6/1985 | McCann | |
| 4,775,313 A * | 10/1988 | Diloia | 425/458 |
| 5,108,584 A * | 4/1992 | Brosseuk | 209/44 |
| 5,197,678 A | 3/1993 | Trezek et al. | |
| 5,312,051 A * | 5/1994 | Preisser | 241/1 |
| 5,361,909 A | 11/1994 | Gemmer | |
| 5,540,395 A * | 7/1996 | Branscome | 241/39 |

(Continued)

FOREIGN PATENT DOCUMENTS

JP    6055097    3/1994

*Primary Examiner* — Shelley Self
*Assistant Examiner* — Onekki Jolly
(74) *Attorney, Agent, or Firm* — Cislo & Thomas, LLP

(57) ABSTRACT

A machine is employed for recovering heavy metals and precious or semi precious minerals, such as gold, copper, lead, diamonds, and garnets from placer, or hard rock ore. The machine employs a cylindrical, annular outer drum mounted for rotation at an inclination to the horizontal and including at least one spiral vane extending the length of its inner surface. A cylindrical, annular inner barrel is mounted within the drum and has an upper fragmentation section, an intermediate screened section, and a lower discharge section. A spray of water is directed into the inner barrel and a water spray bar is located in the annulus between the inner barrel and the outer drum. A fine sluice box is located to receive under one-quarter material input from a side trommel and a coarse sluice box located to receive discharge from the side trommel and discharge from the fine sluice box. The sluice box includes a plurality of landings, matting and screens upon which heavy materials, such as gold or precious stones, collect.

16 Claims, 12 Drawing Sheets

(56) References Cited

U.S. PATENT DOCUMENTS

| | | |
|---|---|---|
| 6,325,311 B1 * | 12/2001 | Preisser .................... 241/74 |
| 7,017,729 B2 | 3/2006 | Gerrity et al. |
| 7,735,656 B1 | 6/2010 | Bassler |
| D631,900 S | 2/2011 | Prochaska et al. |
| 7,942,354 B2 | 5/2011 | Didion |
| 7,984,866 B2 | 7/2011 | Cymerman et al. |
| 2007/0017853 A1 * | 1/2007 | Brosseuk et al. ............ 209/12.1 |
| 2010/0025508 A1 * | 2/2010 | Didion ......................... 241/74 |

\* cited by examiner

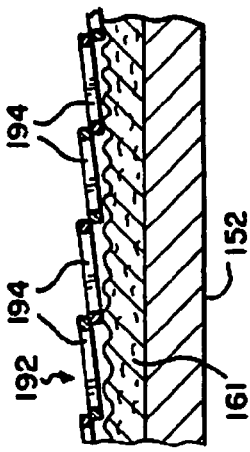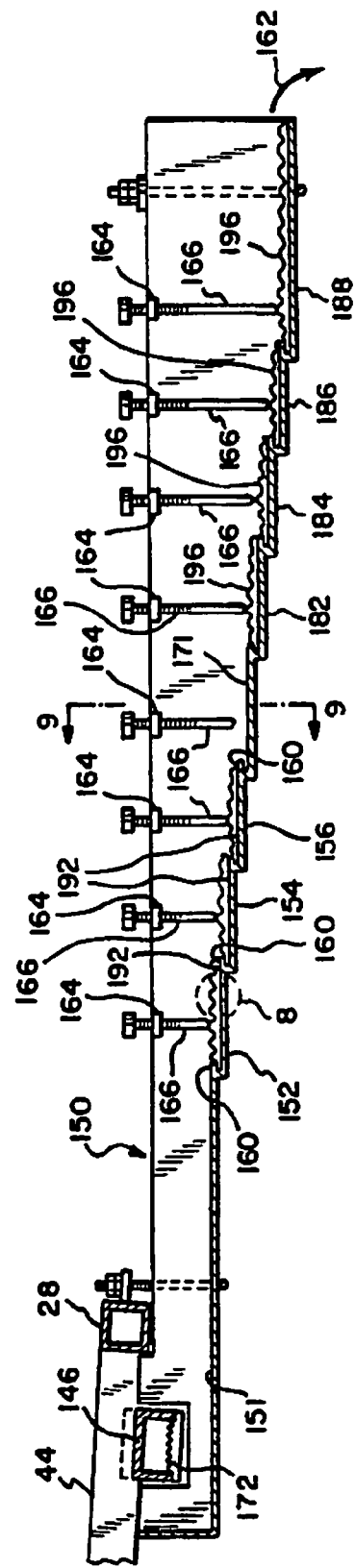

METHOD FOR EXTRACTING HEAVY METALS FROM HARD ROCK AND ALLUVIAL ORE

BACKGROUND OF THE INVENTION

1. Field of the Invention

The present invention relates to a method and machine for recovering heavy materials such as gold, copper, lead, and precious or semi precious stones, from placer (or hard rock) ore.

2. Description of the Related Art

Many different devices have been constructed for the purpose of extracting heavy materials, such as gold and other heavy metals and minerals from placer or hard rock ore. One very significant problem with conventional recovery devices that are used to recover gold or minerals from placer or hard rock ore is that the apparatus employed is unable to separate and recover the very fine particles of valuable material and or separate valuable particles that have a slightly higher specific gravity than the non precious material from placer or hard rock bearing ore. As a consequence, much of the valuable material processed through conventional recovery systems is not separated from the ore, but is discarded along with the tailings. More specifically, conventional placer and or hard rock ore gold recovery devices recover minimal metals or minerals having a particulate size finer than 300 mesh and or having a minimum specific gravity. That is, particles that will pass through a mesh screen having more than three hundred openings per inch or particles having a specific gravity of less than 9. Furthermore, conventional recovery systems discard most of the fine particles having a mesh size in the range of 200 to 300 or are less than 9 specific gravity such as diamond which is 4.5 specific gravity. Naturally, this reduces the efficiency and profitability of conventional ore recovery operations considerably.

One disadvantage of conventional gold or diamond recovery systems is that as each new load of gravel ore is added to the system, a surge is created in the water flowing through the system. This surging effect carries away many of the fine particles of gold or diamonds that are originally retained in the system.

A further disadvantage of conventional recovery systems involves the very large requirement for water that is necessary for their operation. In conventional gold recovery systems four thousand gallons of water per minute are typically required to process two hundred cubic yards of ore per hour to achieve only marginally acceptable efficiency of separation of gold or diamonds from the ore. Such vast quantities of water are sometimes unavailable at the sites at which gold or diamonds bearing placer ore is found.

Furthermore, even where such quantities of water are available, the use of such vast volumes of water in placer recovery operations invariably produces a major environmental impact in the area. Also, as a result of the large volume of water required for operation of conventional placer ore recovery devices and their relatively low efficiency of recovery, large holding ponds are necessary to receive tailings, so that the fine particles which merely pass through conventional systems can settle after processing. Failure to provide such holding ponds for conventional gold recovery systems leads to a discharge of fine ore particulates in water, thus significantly adversely affecting the environment and wild life in areas where minerals are typically mined.

In gold or diamond mining the efficiency of recovery with conventional systems drops rapidly from an initial efficiency of recovery of about 90% during the first three hours of operation to a recovery rate of approximately 60%. Even this reduced efficiency of recovery can be maintained for only about four or five days. Thereafter, the efficiency of recovery drops even further to the point where continued profitability of operation is unacceptable without a complete shutdown of operations and cleaning of the equipment.

A further disadvantage of conventional placer ore gold or diamond recovery systems is the extensive time of cleanup that is required. Such systems normally require approximately three hours for cleanup, during which no gold is being recovered. This extensive cleanup time adds significantly to the cost of operations.

Other very significant disadvantages of conventional gold recovery equipment are the great bulkiness, large cost and difficulty in transporting the equipment required. For example, several different models of gold recovery plants are manufactured by IHC Holland, a company headquartered in The Netherlands. Or MSI Madden Steel Industries of Colorado. A typical system of such a conventional IHC or MSI device requires three railroad cars or three trucks to transport the component parts of the plant to a job site. Furthermore, the cost of such a plant that will process one hundred cubic yards of ore per hour is in excess of one-half of one million dollars. Moreover, due to the heavy weight and great bulk, such conventional equipment can only be transported to sites having good roads or railway access.

SUMMARY OF THE INVENTION

The present invention is a method and apparatus useful for the recovery of gold and other heavy metals and minerals from placer or hard rock ore. The invention provides substantial improvements over the deficiencies of prior art systems. Utilizing the method and apparatus of the invention, heavy metal or mineral particles of 500 mesh are consistently recovered. Indeed, some particles as small as 1300 mesh can be recovered utilizing the system of the invention. The efficiency of recovery of metals or minerals from ore is consistently on the order of 95%, and does not deteriorate with continued operation, since the system is self-cleaning.

The system of the invention utilizes and reutilizes the same water at different stages in the separation process, so that far less water for operation is required than in conventional placer or hard rock mining systems. Indeed, to process two hundred cubic yards of placer ore per hour, only nine hundred gallons of water per minute is required, as contrasted with a requirement for 4000 gallons of water per minute to process the same ore at a lower recovery rate with conventional systems.

The apparatus of the present invention weighs far less than competitive equipment. Even the heaviest model which can process more than two hundred cubic yards of ore per hour weighs approximately 38,000 to 48000 pounds, which is far less than competitive systems. Moreover, all models of the device are portable and can be towed behind a truck. The device is quite compact and does not represent an oversized highway load, as do conventional systems. Moreover, the smaller models of embodiments of the equipment of the invention can be towed off road, as well as on highways.

The system of the invention does not require pre classification of the ore before processing and it does not produce surging when new loads of ore are introduced into the hopper. To the contrary, large gravel fragments are processed in the initial stage, which is a combination of a hopper and a grizzly, and the over-sized material is discarded as clean tailings, this gives the opportunity of recovering gold that is stuck to the over-sized material which is typically discarded in competitive placer recovery systems. The initial stages of separation employed in the system of the invention reduce the amount of solid material that passes completely through all stages of separation from an initial volume down to about 5% of that initial volume for processing in the final stages while maintaining a recovery efficiency of 95%. For example, placer ore loaded into the input hopper of the equipment at the rate of two hundred cubic yards per hour is reduced down to eight cubic yards per hour passing through the final recovery sluice stage. Greater than 90% of the recovered gold and/or diamonds is concentrated in only 5% of the volume of the ore processed. These precious metals are typically found as extremely fine particulate matter that nevertheless can be recovered using the system of the invention.

A further advantage of the system of the invention is the ease of cleanup. The system is essentially self-cleaning, so that the only cleanup required is the recovery of the gold, copper, lead, precious or semi precious gem stone particles from the sluice box mats. This recovery process takes only about 2 minutes, as contrasted with the three hour cleanup which is required in conventional systems. Furthermore, the equipment of the invention can be rapidly set up, since it is transported as a mobile unit fully assembled on a wheeled chassis. The only setup required is the positioning of the device so that it is properly oriented relative to the horizontal, and the immersion of the water pump intake into the water supply which is required.

In one broad aspect the present invention may be considered to be an apparatus for extracting heavy materials from ore comprising a cylindrical, annular outer drum, a cylindrical, annular inner barrel, a sluice box, a means for directing a spray of water into the inner barrel, a means for supplying a flow of water to the sluice box, and drive means for rotating the inner barrel and the outer drum such that the inner barrel is rotated at a greater speed than that of the outer drum.

The outer drum is mounted for rotation in a disposition inclined relative to the horizontal so as to define upper and lower ends thereof. The outer drum has a radially inwardly extending lip at its lower extremity. The outer drum also has a cylindrical inner surface with at least one round spiral vane mounted thereon to extend between said upper and lower ends with a pitch of no less than 12" in the smaller machines and no greater than 48" in the largest machine.

The cylindrical, annular inner barrel or drum includes an upper fragmentation section, an intermediate screened section, and a lower discharge section. The upper fragmentation section is provided with three inwardly directed, longitudinally oriented impact vanes spaced equally apart. The intermediate trommel section also has three inwardly directed, longitudinally oriented impact vanes spaced equally apart and is delineated from the upper section by an upper inwardly extending annular lip. The lower discharge section is delineated from the trommel section by an inwardly directed intermediate annular lip. The lower discharge section also has an inwardly directed lower annular lip at its lower extremity.

The sluice box is located to receive as an input discharge from the upper end of the outer drum. The spray means for the inner barrel directs a spray of water into the trommel section of the inner barrel while another water supply directs a flow of water to the sluice box. A drive means, typically a gasoline or diesel engine, rotates the outer drum at a first speed so that the round spiral vane urges material therein toward the upper end thereof, and also rotates the inner barrel at a second speed that is greater than the first speed.

Preferably a single spiral round shaped vane as aforesaid is provided in the outer drum. The vane has the same pitch and is oriented at equal accurate displacements relative to each other about the axis of the outer drum. For ⅔ of the distance from the lower and upper ends of the outer drum the spiral consists of two equal round vanes mounted on top of each other at a forward leaning inclination angle A of 45 degrees towards the upper discharge end of the outer drum, as shown in FIG. 13. The drum is preferably inclined at an angle of between ½" to 2" per lineal foot of outer drum relative to horizontal and is able to be adjusted at an angle separate from the inner trommel drum. The consistency and composition of the ore being processed will govern to some extent the proper angle of inclination of the outer drum relative to horizontal and the rest of the machine. Typically the drum is inclined at an angle of about 1" per foot.

The outer drum is preferably comprised of a longitudinally extending annular extension with at least one radially directed spiral vane extending inwardly there from. This extension is located on the radially extending lip of the outer drum and has a frusto-conical configuration.

The upper section of the inner barrel is provided with three inwardly directed, longitudinally oriented impact vanes spaced equally apart. The next section of the inner barrel has a multiplicity of fine perforations at its upper end and a multiplicity of coarse perforations at its lower end. The fine perforations are preferably about one-quarter of an inch in diameter and the coarse perforations are preferably about one and a half inches in diameter. Like the outer drum, the inner barrel is inclined at an angle of between about two degrees and about fifteen degrees relative to horizontal, often at an angle of about eight degrees. The inner barrel is preferably concentrically mounted relative to the outer drum. The drive means rotates the outer drum at a speed of between about one and ten revolutions per minute. The drive means normally rotates the inner barrel at a speed of between about thirty and fourty revolutions per minute.

Both the outer drum and the inner barrel are preferably mounted on a mobile supporting frame, having wheels for ease of movement. The apparatus is thus extremely portable and self contained. Preferably, a connection is interposed between the main frame and the supporting frame of the outer drum so as to allow independent inclination of the outer drum.

The material comes out of the outer reverse spiral drum at the upper discharge end and is deposited into a transverse trough which transports the concentrate to another trommel which classifies the material again. The second trommel consists of a smaller cylindrical pipe which has a screened section and a discharge section. The screening section consists of a ¼" minus screen which allows the finer particles to pass through the screen and on to another transverse trough which transports it to the first section of the sluice box called a stilling tray. As the ¼" minus particles flow down the stilling tray they are continually separating horizontally by weight. Once they reach the recovery section of the sluice box the valuable particles are trapped below an expanded metal screen within a porous rubber mat. The waste material known as tailings continues on down slope to the discharge end of the sluice box. The ¼" plus material that continued down slope within the side trommel is discharged from the side trommel onto the lower section of the sluice box and reintroduced to the ¼" minus tailings or waste material. The two material sizes flow across another section of stilling tray so as to thoroughly remix them. They then pass over the final section of the sluice box where the valuable ¼" plus particles are trapped within a porous rubber mat located below 1"×1" angle iron riffles which are positioned from side to side of the sluice box at a spacing of 2" apart and are tilted back at 15 degrees of slope.

The sluice is comprised of a plurality of vertically offset landings, whereby material flowing through the sluice box cascades downwardly from one landing to the landing below. Each landing above the lowermost landing terminates in a lip which overhangs the landing below. When the system is properly operated to recover gold or other precious or semi precious minerals, substantially all of the particles that are 500 mesh and coarser are recovered in the top three landings. The fine particles are not washed any further down the sluice box than this, and can be easily recovered by merely temporarily terminating water flow through the sluice box and extracting the deposited particles from the recovery mats.

In another broad aspect the invention may be considered to be a process for separating heavy materials from ore. The process uses an outer hollow cylindrical, annular drum inclined relative to the horizontal to define upper and lower ends and having at least one round spiral vane extending inwardly from its inner wall. The drum also includes a radially inwardly extending lip at its lower extremity. A cylindrical, annular barrel is located within the drum and is inclined relative to horizontal. The inner barrel has an upper fragmentation section, an intermediate trommel section, and a lower discharge section. These sections of the inner barrel are delineated from each other by inwardly directed annular lips. The barrel has a radially inwardly extending lip at its lower extremity. A sluice box having upper and lower ends is provided with its upper end located to receive the discharge from the upper end of the outer drum.

According to the process of the invention, the outer drum is rotated at a first speed in a direction such that the round spiral vane on the interior wall thereof urges material therein toward the top end of the outer drum and toward the upper end of the sluice box. The inner drum is rotated at a second speed that is greater than the first speed discharge is directed from the upper end of the drum as an input into the upper end of the sluice box, and a spray of water is directed into the trommel section of the inner barrel.

Preferably, the outer drum is rotated at a speed of between about six and eight revolutions per minute and the inner barrel is rotated at a speed of between about thirty six and thirty eight revolutions per minute. Preferably also, an independent method of changing the inclination of the outer drum and a spray of water is directed onto the inner cylindrical surface of the outer drum.

To process ore, a flow of water is supplied to the sluice box and ore is fed to the cylindrical inner barrel at a rate of between about one half cubic yards per hour and about three hundred cubic yards per hour. A combined flow of water is directed into said outer drum said inner barrel and into the sluice box at a rate less than one thousand gallons of water per minute.

The invention may be described with greater clarity and particularity with reference to the accompanying drawings.

BRIEF DESCRIPTION OF THE DRAWINGS

FIG. 7 is a sectional elevational view of the sluice box of the placer recovery system taken along the lines 7-7 of FIG. 2.

FIG. 8 is an enlarged elevational detail indicated at 8 in FIG. 7.

FIG. 9 is a transverse sectional view taken along the lines 9-9 of FIG. 7.

DESCRIPTION OF THE PREFERRED EMBODIMENTS

The detailed description set forth below in connection with the appended drawings is intended as a description of presently-preferred embodiments of the invention and is not intended to represent the only forms in which the present invention may be constructed and/or utilized. The description sets forth the functions and the sequence of steps for constructing and operating the invention in connection with the illustrated embodiments. However, it is to be understood that the same or equivalent functions and sequences may be accomplished by different embodiments that are also intended to be encompassed within the spirit and scope of the invention.

Figure 1:
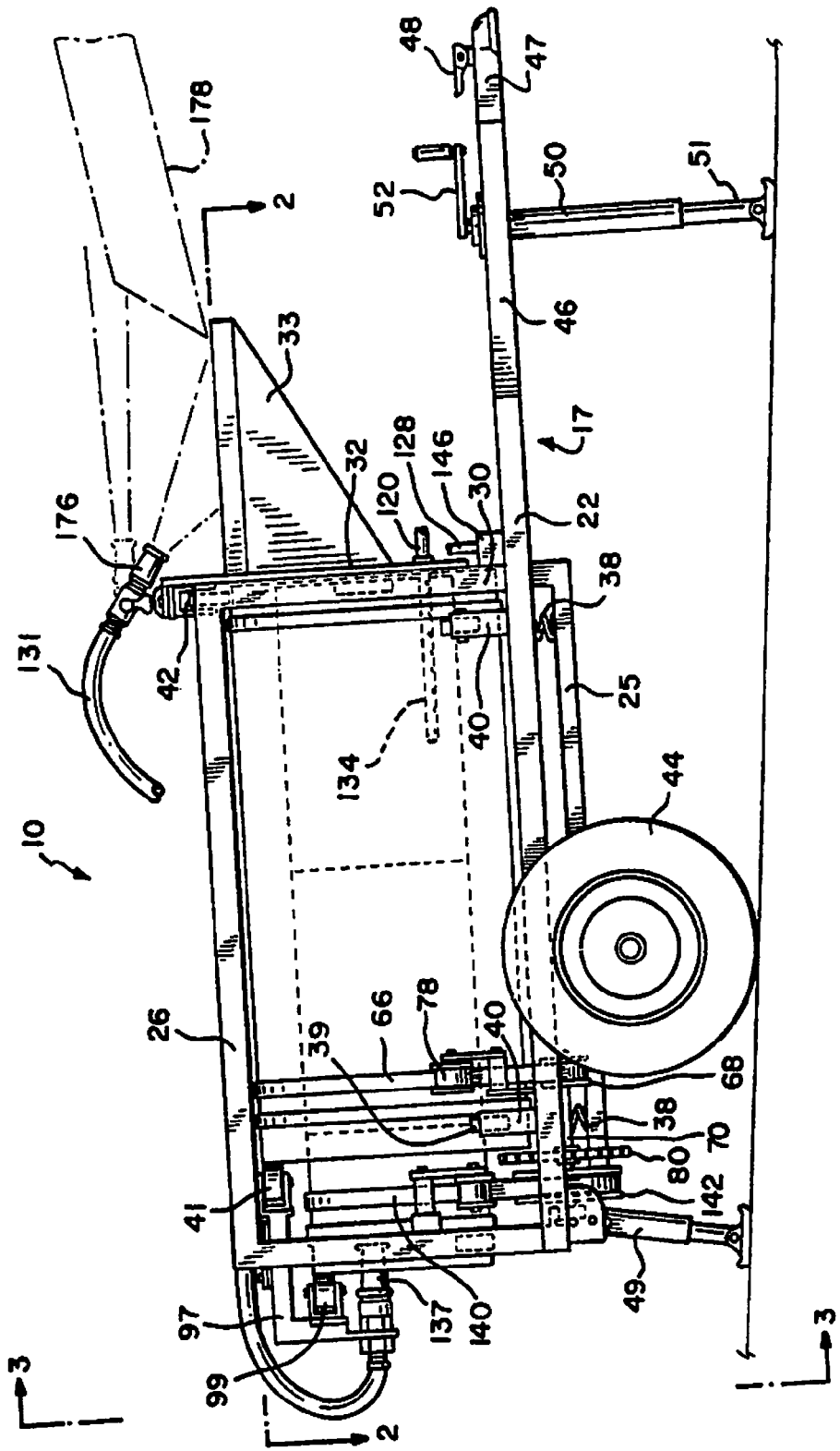
FIG. 1 is a left side elevational view of one embodiment of an apparatus for recovering heavy substances from raw material according to the invention.

FIG. 1 illustrates a portable, mobile placer recovery apparatus 10 for recovering heavy substances from the raw material of placer ore. The placer recovery apparatus 10 is comprised of a sluice box 150, an inner barrel 11, and an outer hollow drum 12 mounted on a mobile supporting chassis 117. When deployed for use the outer drum is inclined relative to horizontal, as indicated by the angle A in FIG. 5. The orientation of the inclined drum 12 thereby defines an upper end 13 and a lower end formed with a radially inwardly directed lip 14.

The Intake Hopper 33

Figure 10:
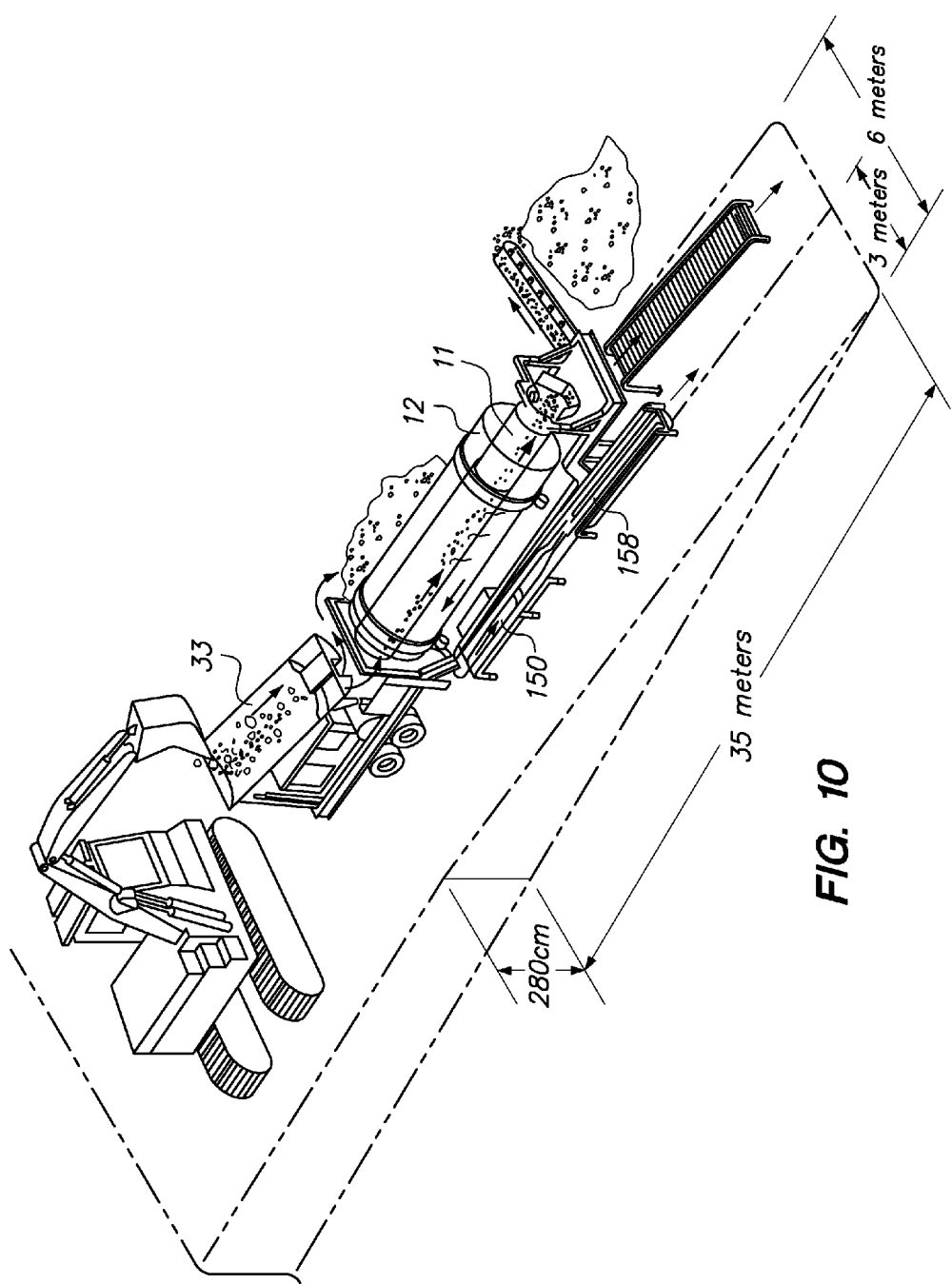
FIG. 10 is a perspective view of another embodiment of a recovery apparatus according to the invention.
Figure 11:
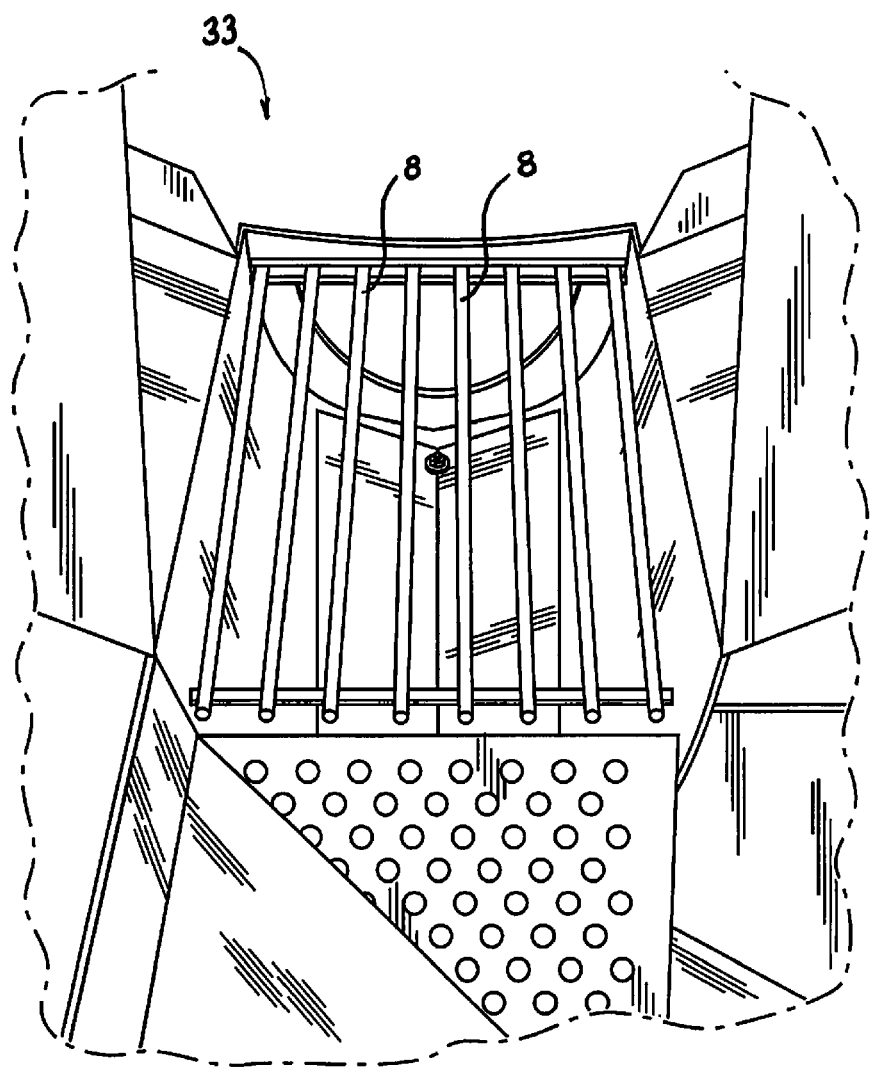
FIG. 11 is a perspective view of an intake hopper and grizzly bars according to one embodiment of the invention.

As shown in FIGS. 10 and 11, the recovery apparatus 10, in keeping with the present invention, may have an intake hopper 33 equipped with a plurality of grizzly bars 8 and a water hose or hoses 131. Preferably, the grizzly bars 8 are manufactured from high-strength steel stock to increase the wear and abrasion resistance for the hard-impact environment of the hopper. They may be round in cross section or comprise other custom cross sections, such as flat, square, diamond, or the like, which are equally anticipated by the present invention.

The bars 8 may be arranged and oriented generally parallel to the direction of the flow of material to promote the separation between over four-foot boulders and under four-foot materials. The grizzly bars 8 may be configured to be stationary or to vibrate or shake to facilitate or speed up the separation process.

The hoses 131, discussed in more detail below, supply water at the intake hopper stage to insure that any fine particles are washed off of the larger boulders before the larger boulders are removed from the hopper since they are too large to fall through the grizzly bars. Below the grizzly bars 8 are is the floor of the intake hopper 33, which may be slanted to cause the filtered materials to proceed down toward the inner barrel 11.

As a result of this configuration of the intake hopper 33, the raw materials is effectively pre-classified. Larger boulders are allowed to pass through the hopper than in traditional systems, and more placer metals or gems are washed free from the surfaces of the oversized boulders that do not pass through the hopper as well.

The Outer Drum 12

The drum 12 is formed with an interior cylindrical wall surface 16 throughout its length between the upper end 13 and the annular lip 14. At least one spiral vane 18 is mounted on the interior wall surface 16 to extend between the lip 14 at the lower end of the drum 12 and the upper end 13 thereof. The vane 18 may be of a uniform pitch, which may be between about ten and fifty-six inches and more preferably between about thirty-six and forty-eight inches. The vane 18 stands about one and one-half and two and one-half inches high, projecting radially inwardly toward the center of the drum from the interior cylindrical wall surface 16 thereof.

Figure 12:
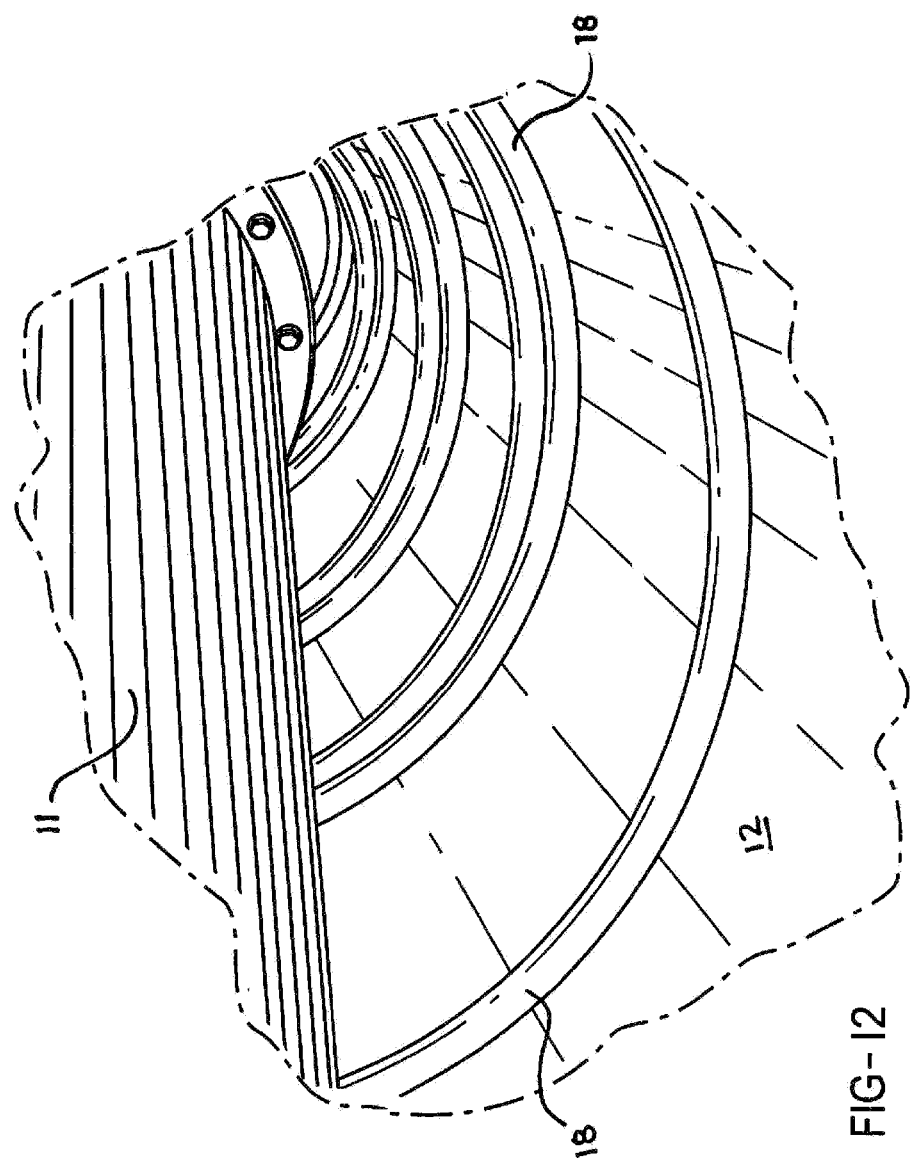
FIG. 12 is a perspective view of a series of spiral vanes on the inside surface of an outer drum according to one embodiment of the invention.
Figure 13:
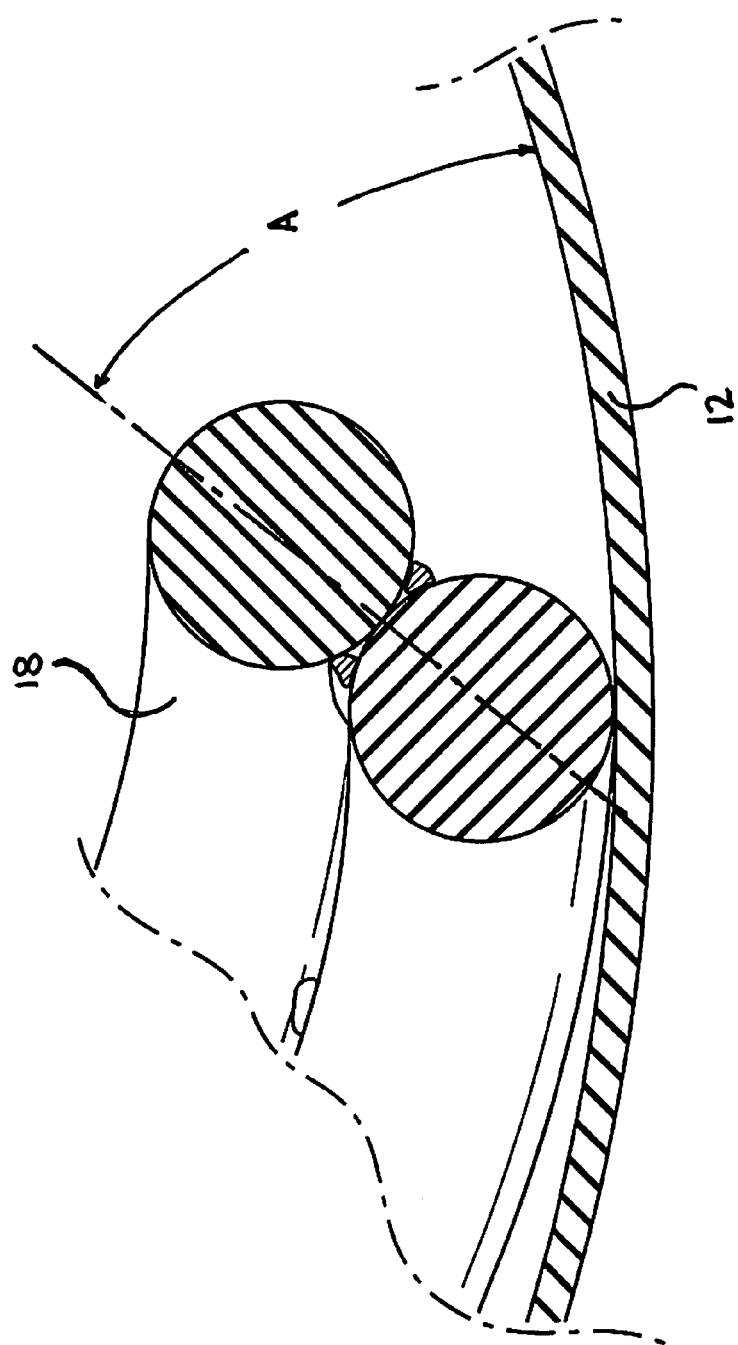
FIG. 13 is a cross sectional view of a double height vane on the inside surface of an outer drum according to one embodiment of the invention.

In a preferred embodiment, the height of the vane 18 is twice this height in the bottom two-thirds of the outer drum 12 and comprised of a second round elongated member mounted to the first and offset forward by angle A or approximately 45 degrees as shown in FIGS. 12 and 13. Spiral vane 18 preferably has a round cross-section so as to produce locally areas of low turbulence close to where the vane 18 mounts to the inner surface 16 of the outer drum 12. In another preferred embodiment, the first vane 18 is double height for the four revolutions of the spiral vanes 18 (from the lower end of the outer drum 12) and has a pitch of approximately forty-eight inches, the next revolution continues to have a pitch of approximately forty-eight inches but is single height, and the remaining revolutions (typically, there are roughly two remaining revolutions) continue to be of single height, but have a lesser pitch of between approximately twenty-four and forty inches.

This configuration ensures that more of the precious metals or gems are allowed to settle in the local calm created just under the double-height portions of vanes 18. Once thus settled, the precious material continues up the spiral process so that it may be collected once it exits the outer drum 12.

In one embodiment of the invention, the outer drum 12 may be about eight feet in diameter and about twenty-four feet in length, although it is to be understood that the sizes of all of the components of the placer recover apparatus 10 may be varied depending upon the rate at which gravel or ore is to be processed.

Figure 5:
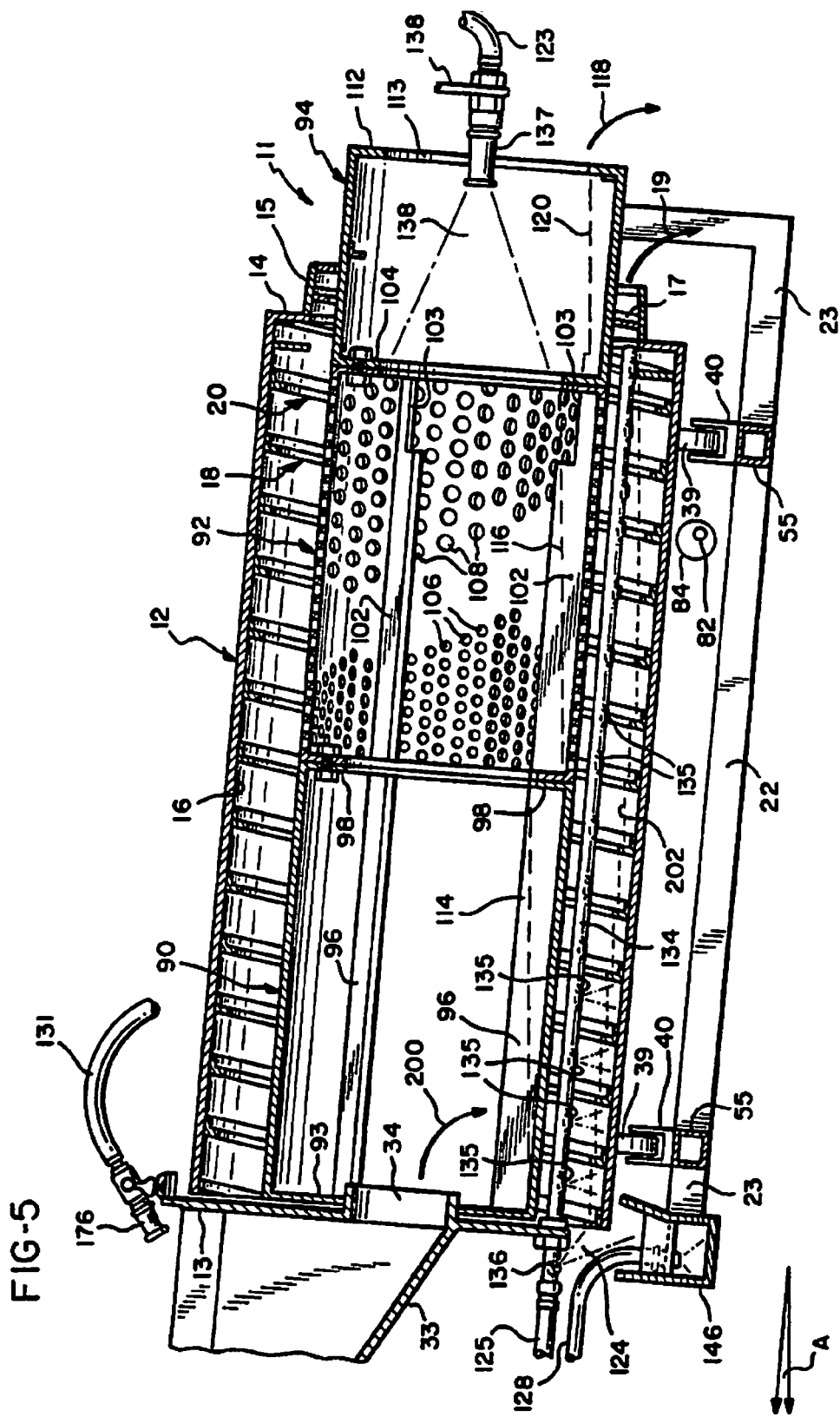
FIG. 5 is a longitudinal elevational sectional view taken along the lines 5-5 of FIG. 2.

As illustrated in FIG. 5 the lower end of the outer drum 12 is formed with the annular, radially inwardly extending lip 14. The lip 14 extends inwardly toward the axis of the outer drum 12 a short distance, which in the embodiment depicted and described may be approximately ten inches. The lower end of the outer drum 12 is also comprised of a longitudinally extending frusto-conical annular drum extension 15 that extends axially away from the cylindrical portion of the outer drum 12 and converges toward the inner barrel 11. On the interior concave frusto-conical wall of the extension 15 there is at least one radially inwardly extending spiral vane 17. The spiral vane 17 is oriented in the same direction as the vane 18 on the interior cylindrical wall surface 16 of the outer drum 12.

The drum extension 15 and the spiral vane 17 defined thereon serve as a surge inhibitor to prevent fine heavy particles from being discharged from the outer drum 12 as tailings. Lighter materials, such as sand and dirt are discharged from the drum extension 15 as tailings indicated diagrammatically at 19 in FIG. 5. The wall of the extension 15 is tapered inwardly from perpendicular alignment relative to the lip 14 at an angle of about four to twelve degrees.

The Chassis 117

The mobile chassis 117 is comprised of a stabilized supporting framework 20 and a floating support 21 upon which the outer drum 12 is mounted. Both the stabilized supporting framework 20 and the floating support 21 are formed of lengths of hollow, square steel tubing that are joined orthogonally. The stabilized framework 20 is comprised of longitudinally oriented steel tubing lengths 22, 23, 24, 25, and 26, transverse tubing lengths 27 and 28 and upright tubing lengths 29, 30, and 31, all welded together. The stabilized supporting framework tubing members generally circumscribe an open skeletal frame.

The forward upright tubing lengths 30 are secured to a flat, rectangular transverse steel end plate 32 to which an ore hopper 33 is secured. The hopper 33 may extend forwardly from the end plate 32 a distance of about ten feet at its upper edge. A large opening is defined in the steel end plate 32. At the lower extremity of the hopper 33 there is a cylindrical annular hopper chute 34 that extends through the opening in the end plate 32.

The stabilized framework 20 is mounted upon a pair of supporting wheels 44 having rubber tires thereon which support the stabilized framework 20 from beneath through leaf springs 45. At the front of the chassis 117, there is a yoke 46 having a tongue 47 equipped with a tow hitch coupling 48. The tow hitch coupling 48 is provided to allow the placer recovery apparatus 10 to be pulled behind a truck.

Retractable rear stabilizing legs 49 are located at the rear end of the placer recovery apparatus 10 behind each of the wheels 44. The retractable rear stabilizing legs 49 are mounted on the stabilized framework 20 and include telescoping elements which can be lowered as depicted in FIG. 1 to aid in stabilizing the framework 20 during operation of the placer recovery apparatus 10. At the front of the placer recovery apparatus 10 an adjustable front leg 50 is secured to the yoke 46. The front leg 50 serves to stabilize the front of the placer recovery apparatus 10 and includes a telescoping foot 51 that is operated by means of a crank 52 to raise or lower the yoke 46 relative to the wheels 44. The adjustable front supporting leg 50 is thereby used to adjust the angle of inclination of the stabilized framework 20, and thus the angle of inclination of both the inner barrel 11 and the outer drum 12. This angle is indicated at A in FIG. 5.

The framework 20 also allows the outer drum 12 to be inclined separate from the inclination of the inner barrel 11. In this way, the two inclination angles in FIG. 10 may be adjusted separate from one another to maximize the collection of the desired metals or gems. The percentage of collections has been observed to depend considerably upon these relative inclinations. In particular, for metals of high densities, such as gold, which has a density of 19.30, the most advantageous range or inclinations of the outer drum 12 appear to be approximately 1.5" per ft, give or take 0.25", with the most advantageous range or inclinations of the inner barrel 11 being approximately 1" per ft, give or take 0.25". By contrast, for gems of low densities, such as diamond, which has a density of 3.51, the most advantageous range or inclinations of the outer drum 12 appear to be approximately 0.75" per ft, give or take 0.25", with the most advantageous range or inclinations of the inner barrel 11 being approximately 1" per ft, give or take 0.25".

The floating support 21 is a generally U-shaped structure, the tubular steel legs 55 of which extend transversely relative to the chassis 117. The legs 55 are welded to a longitudinal tubular steel member 35, visible in FIGS. 2 and 6. The opposite ends of the transverse legs 55 are linearly aligned with the transverse members 27 of the stabilized framework 20 and are joined thereto by hinge connections. The hinge connections allow the rear or upper end of the floating support 21 to move up and down by way of a jack system to change the inclination of the outer drum relative to the inner drum. (there is no oscillation in the new design this didn't work well)

Figure 6:
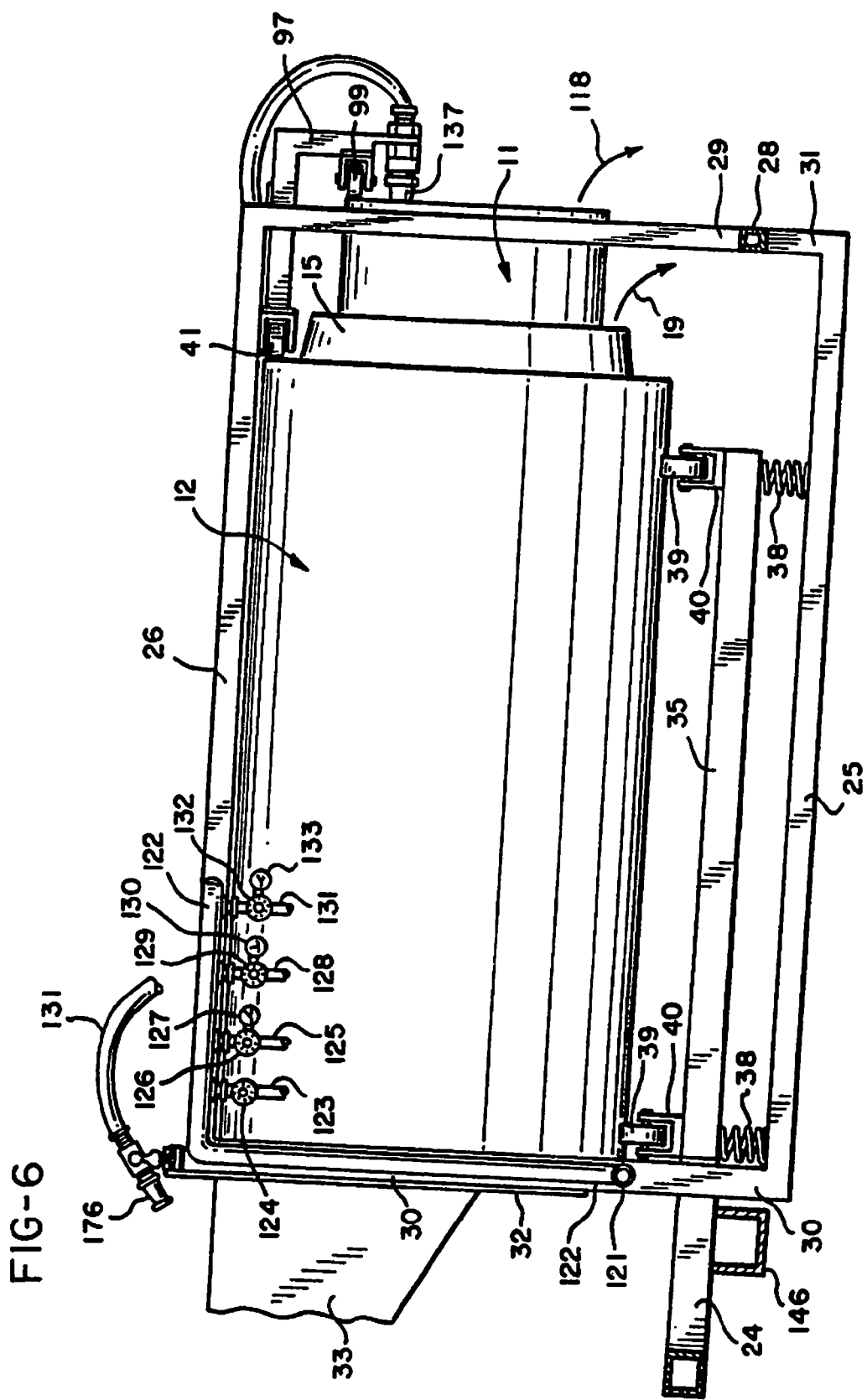
FIG. 6 is a longitudinal elevational sectional view taken along the lines 6-6 of FIG. 4.

The longitudinal tubular member 35 of the floating support 21 is aligned directly above the longitudinal member 25 of the stabilized framework 20. A, vertically aligned, tubular members 25 and 35, as illustrated in FIG. 6. The longitudinal member 35 of the floating support 21 is thereby supported above the longitudinal member 25 of the stabilized framework 20 and can oscillate relative thereto.

Figure 4:
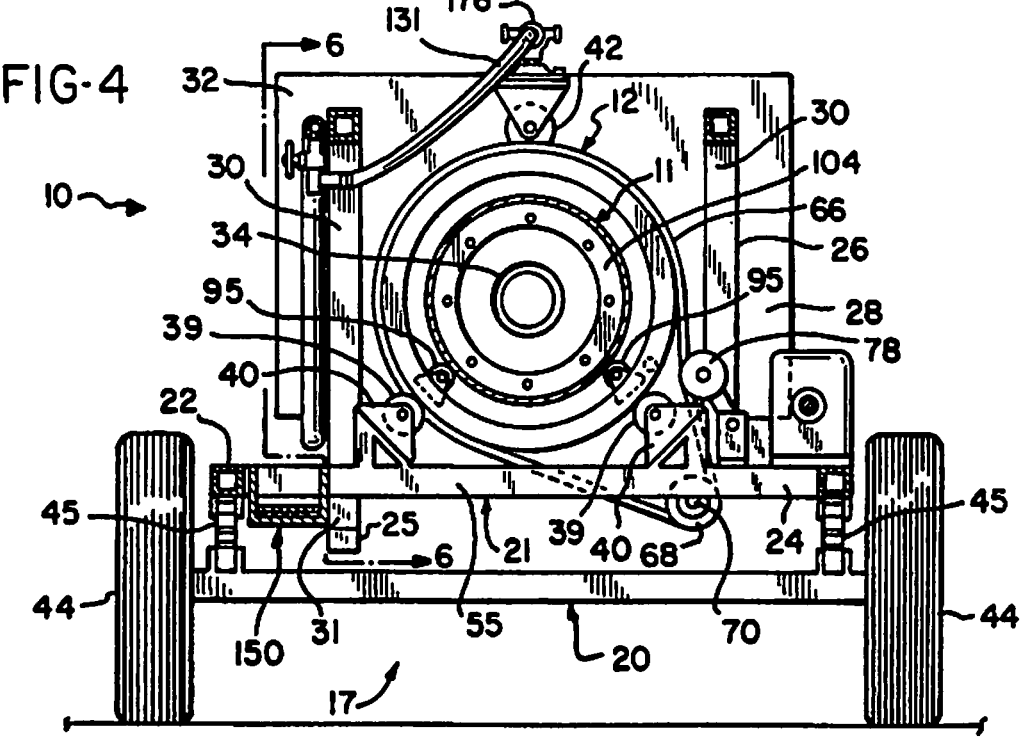
FIG. 4 is a transverse elevational sectional view taken along the lines 4-4 of FIG. 2.

The outer cylindrical drum 12 is mounted upon the floating support 21. Front and rear pairs of supporting rollers 39 are interposed between the floating support 21 and the outer cylindrical surface of the outer drum 12 in spaced separation from each other along the transverse legs 55 of the floating support 21, as illustrated in FIG. 4. The rollers 39 are rotatably mounted in roller brackets 40 and support the outer drum 12 from beneath. Stabilizing rollers 41 and 42 respectively bear longitudinally against the lip 14 at the lower end of the outer drum 12 and radially inwardly against the top of the outer surface of the outer drum 12 as illustrated in FIGS. 1 and 4. The rollers 41 and 42 are mounted in roller brackets that are secured to the stabilized framework 20.

The outer drum 12 is driven in rotation by means of a drive belt 66, which in turn is driven by a pulley 68. The pulley 68 is driven by a power take off shaft 70, that in turn is driven by a chain 72. A gasoline, diesel or electric engine 74 turns its engine drive shaft and a drive sprocket 76 to advance the chain 72 to rotate the power take off shaft 70. The engine 74 is mounted on the stabilized framework 20 and the power take off shaft is journaled for rotation relative to the stabilized frame 20 as well. The power take off shaft 70 is journaled for rotation in pillow blocks 144 that are attached to the stabilized supporting framework 20, as depicted in FIG. 3.

A speed reduction sprocket 77 is keyed to the power take off shaft 70 so that the drive belt 66 rotates the outer drum 12 at a much lower speed than the speed of rotation of the drive shaft of the engine 74. Typically the outer drum 12 is driven in rotation at a speed of between one and ten revolutions per minute, preferably between about four and eight revolutions per minute. A spring biased tensioning roller 78 is mounted on the stabilized framework 20 by means of a spring biased arm. The tensioning roller 78 bears against the belt 66 to maintain tension in the belt 66.

Figure 3:
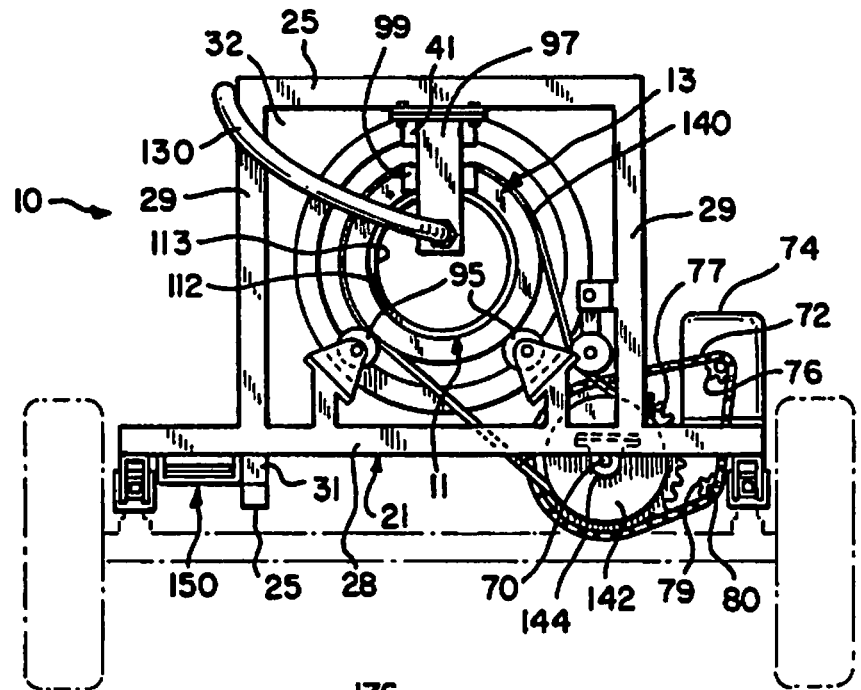
FIG. 3 is an end elevational view taken along the lines 3-3 of FIG. 1.

The chain 72 also drives another sprocket 79, visible in FIG. 3. The sprocket 79 is keyed to a transmission input shaft 80 that is journaled for rotation relative to the stabilized frame 20. The transmission input shaft 80 extends longitudinally forward to a speed reducing gear box 81.

The speed reducing gear box 81 is mounted on the stabilized frame 20 and changes both the speed and direction of rotation of the transmission input shaft 80. From the speed reducing gear box 81 a transmission output shaft 82 extends transversely at right angles to the transmission input shaft 81, passing beneath the outer drum 12. The end of the transmission output shaft 82 remote from the speed reducing gear box 81 is journaled in a supporting bearing 83 that is located on the facing surface of the longitudinal tubing member 35 of the floating support 21.

The transmission input shaft 80 rotates at approximately one thousand revolutions per minute, while the transmission output shaft 82 from the gear box 81 rotates at a speed of approximately three hundred revolutions per minute. The transmission output shaft 82 is employed to impart vibrations to the outer drum 12. A weighted disk 84 is mounted eccentrically on the transmission output shaft 82 between the bearing 83 and the gear box 81. The eccentric disk 84 rotates freely beneath the outer drum 12 and may be formed of a disk-shaped ten pound weight mounted eccentrically so as to exert a two pound throw. The eccentric disk 84 resides beneath the outer drum 12 in a vertical plane aligned parallel to the axis of the outer drum 12 and is visible in FIG. 5.

The rotating eccentrically mounted weight 84 functions as a means for applying vibration to the outer drum 12 relative to the stabilized framework 20. The eccentric throw of the rotating disk 84 causes the legs 55 of the floating support 21 to move in oscillation relative to the members 27 of the stabilized framework 20 about the axis 36. The hinge connections between the legs 55 of the floating support 21 and the members 27 of the stabilized framework 20 permit this motion. The springs 38 which are interposed between the longitudinal member 35 of the floating support 21 and the longitudinal member 25 of the stabilized framework 20 enhance the oscillatory affect.

The spring biased tensioning roller 78 ensures that tension is maintained in the belt 66 despite the vibration of the outer drum 12 relative to the stabilized supporting framework 20.

The Inner Barrel 11

The cylindrical inner barrel 11 may be formed of lengths of steel tubing about three and one half feet in diameter and about thirty one feet in length. The inner barrel 11 is comprised of three sections, namely an upper fragmentation section 90, an intermediate trommel section 92, and a lower discharge section 94. The interior of the cylindrical inner barrel 11 is illustrated in FIG. 5.

At its upper end the fragmentation section 90 is formed with an annular upper end wall 93 which defines a central axial opening therein. The edges of the end wall 93 are radially supported by the cylindrical chute 34 at the upper or upstream end of the inner barrel 11 by means of bearings, thereby holding the upper end of the cylindrical, annular inner barrel 11, in coaxial alignment with both the chute 34 and with the cylindrical, annular outer drum 12. The lower end of the cylindrical, annular inner barrel 11 is supported by rollers 95 from beneath, as illustrated in FIG. 4. The rollers 95 are mounted for rotation within brackets that are secured to the rear transverse tubing member 28 of the stabilized framework 20. The rollers 95 ride against the convex outer surface of the discharge section 94 to thereby maintain the lower end of the cylindrical, annular inner barrel 11 in coaxial alignment within the outer drum 12. Mounting bracket 97, secured to the rearmost upper cross member 25 of the stabilized framework 20 carries another roller 99. The roller 99 bears against the lip 112 of the downstream end of the inner barrel 11 to provide stabilization at the rear of the barrel 11.

Figure 2:
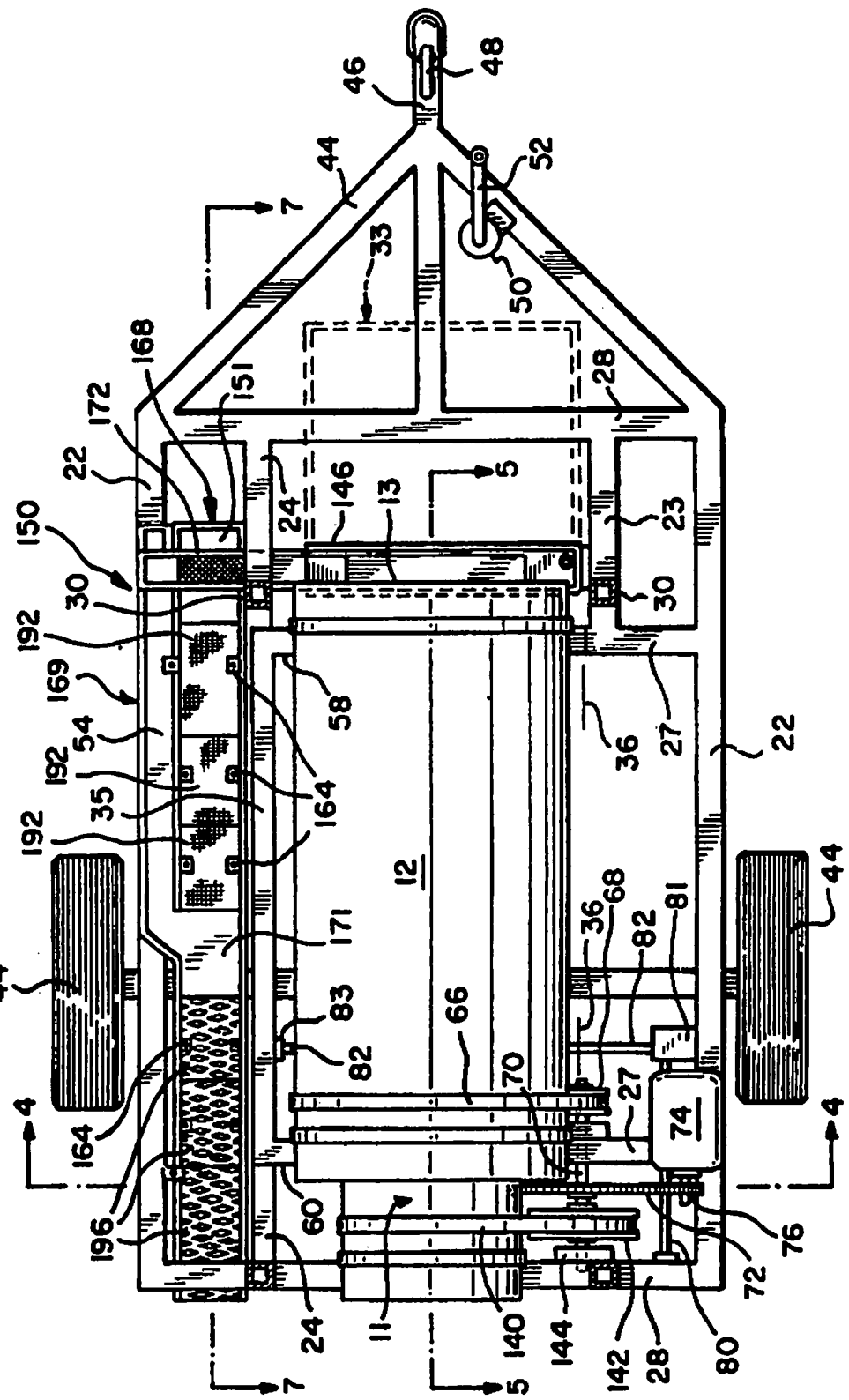
FIG. 2 is a sectional view taken along the lines 2-2 of FIG. 1.

As illustrated in FIGS. 2 and 3, the inner barrel 11 is driven in rotation by means of a belt 140 which is driven from a pulley 142 that is attached to the power take off shaft 70. The pulley 142 is driven by the motor 74 through the drive chain 72. The pulley 142 is larger than the pulley 68 and the outer diameter of the inner barrel 11 is smaller than the outer diameter of the outer drum 12. Consequently, the engine 74 drives the inner barrel 11 through the belt or chain 140 at a speed greater than the speed of rotation of the outer drum 12. The engine 74 drives the inner barrel 11 at a speed of between about and thirty to fourty revolutions per minute while driving the outer drum 12 at a speed of between about one and ten revolutions per minute.

The upper fragmentation section 90 of the inner barrel 11 has three longitudinally oriented impact vanes 96 angularly spaced from each other at uniform one hundred twenty degree intervals apart about the interior diameter of the fragmentation section 90, as illustrated in FIG. 5. The vanes 96 are radially aligned within the fragmentation section 90 and extend inwardly into the interior thereof a distance of about five inches. A radially inwardly extending annular lip 98 is formed at the lower or downstream end of the fragmentation section 90 to delineate the fragmentation section 90 from the trommel section 92. The lip 98 is formed by the facing juxtaposed annular flanges on the downstream and of the fragmentation section 90 and on the upstream end of the trommel section 92. The flanges are bolted to each other at spaced intervals. The annular lip 98 extends radially inwardly toward the axis of rotation of the inner barrel 11 a distance of approximately three inches.

The intermediate trommel section 92 is likewise comprised of three longitudinally aligned vanes 102 which are angularly spaced from each other a uniform distance of one hundred twenty degrees apart. The upstream portions of the vanes 102 extend radially inwardly a distance of five inches. At their downstream extremities the vanes 102 are cut away as indicated at 103 so as to allow material to remain in the trommel section 92 longer. At the lower downstream extremity of the trommel section 92, there is a lower inwardly extending annular lip 104. The lip 104 is formed by the facing juxtaposed annular flanges on the downstream end of the trommel section 92 and on the upstream end of the discharge section 94. These flanges are bolted together at spaced intervals throughout their interfaces. The lip 104 delineates the intermediate trommel section 92 from the lower discharge section 94 and extends radially inwardly a distance of about three inches.

The cylindrical wall of the trommel section 92 is perforated with a multiplicity of openings throughout. At its upper or upstream end the cylindrical wall of the trommel section 92 is punched with a multiplicity of fine perforations 106, each about one-quarter inch in diameter. The finely perforated portion of the trommel section 92 extends longitudinally from the upstream end thereof toward the lower or downstream end about forty percent of the total length of the trommel section 92. At that point a multiplicity of coarse perforations 108 commence. The coarse perforations 108 are typically about one and three-quarters inches in diameter. The coarsely perforated portion extends all the way to the lower annular lip 104 at the lower end of the trommel section 92.

The lower discharge section 94 of the cylindrical, annular inner barrel 11 includes, in addition to its upstream flange, a radially inwardly directed lower annular lip 112 at its lower extremity. The lip 112 also extends radially inwardly a distance of approximately three inches and defines therewithin a downstream opening 113.

As illustrated in FIG. 5, the fragmentation section 90, the trommel section 92, and the discharge section 94 of the cylindrical, annular inner barrel 11 are all of a uniform outer diameter and are all securely bolted together in mutual longitudinal alignment so as to rotate as a unit within the cylindrical, annular outer drum 12. As the inner barrel 11 rotates, large clumps of aggregate matter are lifted by the vanes 96 and dropped, so as to break up the material passing through the inner barrel 11 as much as possible. The height of the lip 98, and the angle of inclination A serve to define a level of repose 114 of fragmentation placer ore lying within the fragmentation section 90. As the volume of material in the fragmentation section 90 increases above the level of repose 114, the material will pass from the fragmentation section 90 into the trommel section 92.

In the trommel section 92 the fragmentation material is sifted, with particles of one-quarter inch mesh and finer passing radially outwardly into the surrounding outer drum 12, commencing immediately in the upstream portion of the trommel section 92. Larger particles are lifted and fragmented further by the vanes 102. The apertures 108 in the downstream portion of the trommel section 92 allow larger pieces of material up to a maximum dimension of one and three-quarter inches to pass through the wall of the trommel section 92 radially outwardly and into the surrounding annular outer drum 12. Together the lip 104, and the angle of inclination A define a level 116 of ore within the trommel section 92. As the volume of material within the trommel section 92 builds up above the level 116, large chunks of material pass downstream out of the trommel section 92 and into the discharge section 94.

The lip 112 of the discharge section 94 forms a barrier over which large pieces of lighter material are discharged as a tailing, indicated generally at 118. The lip 112 forms a barrier which tends to retain the heavier material within a level of ore indicated at 120. The material immediately upstream from the lip 112 in the discharge section 94 can be easily viewed through the opening 113 delineated by the lip 112. Thus, it is quite possible to see large nuggets of gold or other heavy material which may collect within the material rising to the level of ore 120 by merely looking through the opening 113. These nuggets can be removed to add to the total amount of gold recovered.

The Water Supply

In order to process placer ore through the placer recovery apparatus 10, a source of water is necessary for washing, spraying and sluicing. A conventional water pump (not shown) is carried on the mobile supporting chassis 117, but is deployed in a stream bed or a river bed in a conventional manner in order to pump the necessary water to the system. The pump is equipped with a hose which is releasably coupled to a hose coupling 121 that provides an inlet to a water supply manifold 122 which is mounted on one of the forward upright tubing members 30 of the stabilized supporting framework 20, as illustrated in FIG. 6. The water supply manifold 122 passes upwardly and makes a right-hand turn rearwardly along one of the upper, longitudinally extending tubing lengths 26 on the side of the chassis 117.

The water supply manifold 122 has one outlet leading to a wash water hose line 123 through a manual control valve 124. Another tap from the water supply manifold 122 leads to a spray bar supply hose 125 having a manually adjustable valve 126 therein. A flow meter gauge 127 is located at the valve 126. Another tap from the water supply manifold 122 leads to a sluice water supply hose 128 having a manually adjustable valve 129 therein. A flow meter gauge 130 registers the flow of water to the hose 128. The water supply hose 131 having a manually operable valve 132 therein. A flow meter gauge 133 registers the volume of water flow to the hopper supply hose 131.

The Spray Bar 134

The spray bar hose 125 leads to the lower edge of the end plate 32 and is connected to an elongated spray bar 134 which directs water to the open upper end of the outer drum 12, as indicated in FIG. 5. The spray bar 134 is secured to and passes through the transverse upright hopper end mounting plate 32 from the front and emerges therefrom on the downstream side thereof as depicted in FIG. 5. The spray bar 134 is approximately two inches in outer diameter and extends the entire length of the inner cylindrical surface 16 of the outer drum 12. The spray bar 134 extends into the annular space between the outer cylindrical drum 12 and the inner cylindrical barrel 11. The spray bar 134 includes a plurality of nozzles 135 which are directed radially outwardly toward the inner wall of the outer drum 12. Another nozzle 136 forward of the end plate 32 sprays the lower edge of the upper end 13 of the outer drum 12 where material is discharged therefrom.

Wash Water to the Inner Barrel 11

The wash water supply hose 123 extends to the lower or downstream end of the placer recovery apparatus 10 and is connected to a water nozzle 137 that is held from the rearmost upper transverse stabilized framework member 25 by means of the mounting bracket 97. The water nozzle 137 extends through the central opening 113 at the downstream end of the discharge section 94 of the inner barrel 11. The water nozzle 137 is longitudinally aligned with the common axis of rotation of both the inner barrel 11 and the outer drum 12. The nozzle 137 directs a fine spray of water, indicated in FIG. 5 at 138, through the opening at the junction of the trommel section 92 and discharge section 94 and up into the downstream portion of the trommel section 92.

The Hopper Water Supply

The upper water supply line 131 is connected to a nozzle 176 which is attached by a gimbal mount to the transverse hopper mounting plate 32. The nozzle 176 can be directed as desired to either an ore chute 178, or the ore hopper 33, as depicted in FIGS. 1 and 6.

The Fine Sluice Box 150 and Coarse Sluice Box 158

Beneath the upper end 13 of the outer drum 12 there is a transverse trough 146 disposed to receive fine particles of heavy material that are not discharged as either large, light tailings or as small light tailings 19, but to the contrary are carried back by the screw action of the helical vanes 17 and 18 and ejected from the upper, upstream end 13 of the outer cylindrical drum 12. The fine particles of heavy material are ejected from the upper end 13 of the outer cylindrical drum 12 in a slurry with water in the outer drum 12 that is forced upwardly by means of the inclined vanes 17 and 18. The sluice water supply hose 131 is secured in position, as depicted in FIG. 5 to provide additional water from the water supply manifold 122 to the sluice box 150 through the trough 146. The trough 146 extends transversely and is inclined at a slight downward slope toward the fine sluice box 150, which is illustrated in FIGS. 2, 7, and 8.

But, before the slurry reaches the fine sluice box 150, it is passed through a side trommel 100 to separate out material larger than one-quarter inch in size. The below one-quarter inch material is then sent to the fine sluice box 150. In this way, the fine debris is sifted without the interference and turbulence that the larger debris otherwise would create in the fine sluice box 150. The result is that less fine valuables is lofted up and through the fine sluice box 150 and thus more fine valuables is collected.

The fine sluice box 150 is longitudinally aligned and is located alongside the outer cylindrical drum 12 and in generally parallel alignment therewith. As best illustrated in FIGS. 2 and 7, the fine sluice box 150 is located to receive as an input the discharge of water and entrained solids from the under one-quarter inch filter of the side trommel 100. Of all of the solid material processed through the placer recovery apparatus 10 only about five percent by volume is discharged into the fine sluice box 150.

Figure 14:
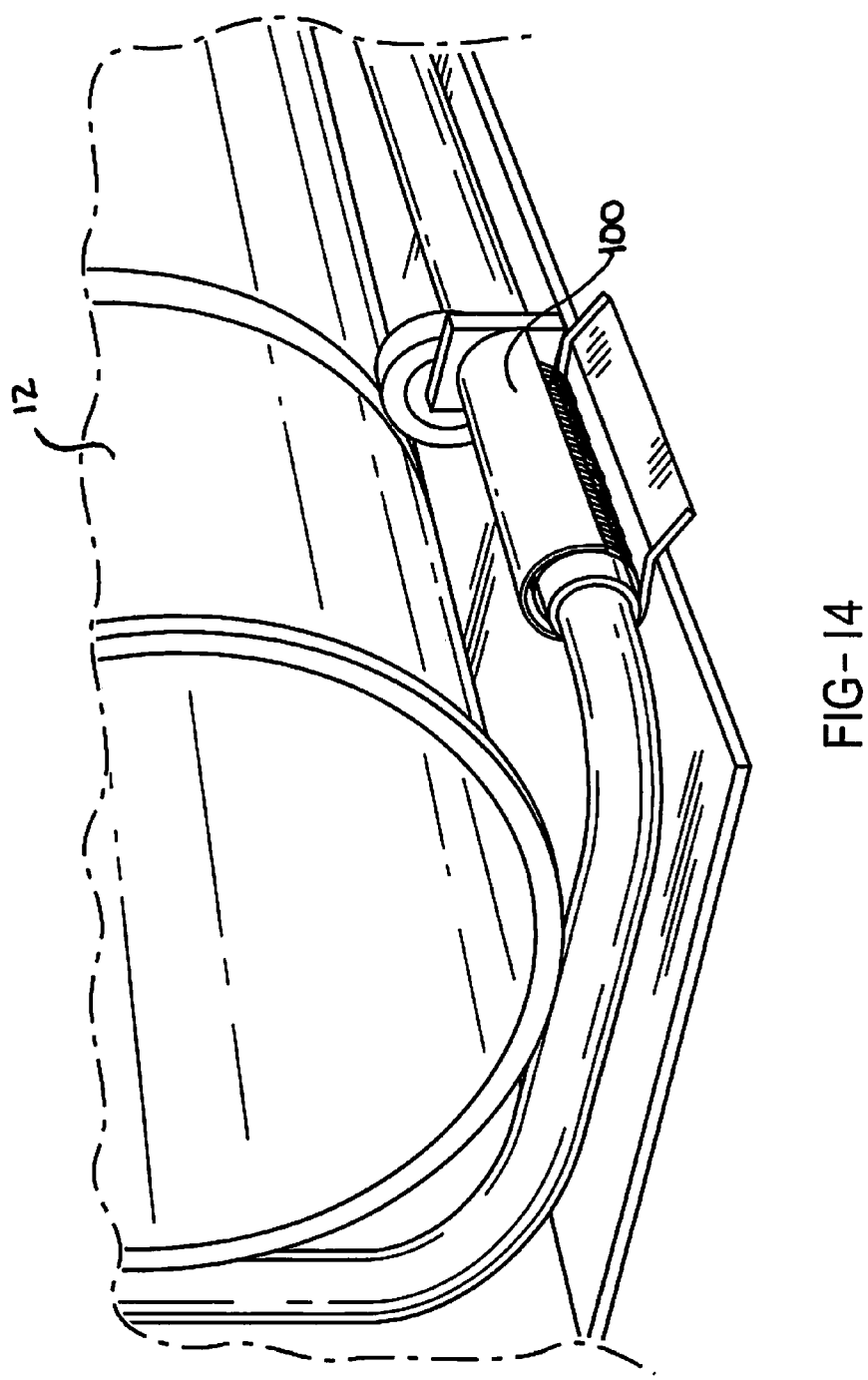
FIG. 14 is a perspective view of a side trommel having an under one-quarter inch screen and exit to direct fine material to a fine sluice box (not shown) according to one embodiment of the invention.
Figure 15:
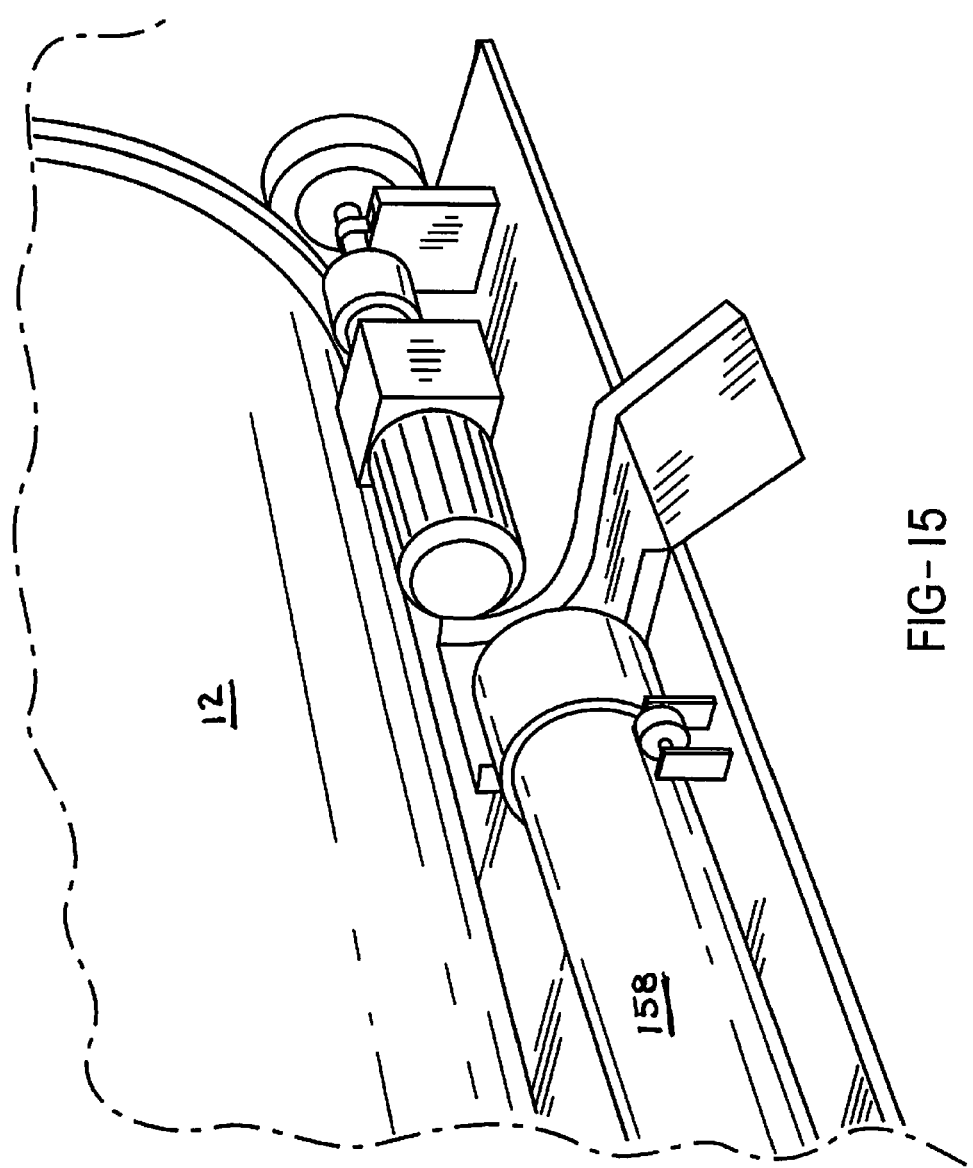
FIG. 15 is a perspective view of a discharge end of a side trommel to direct coarse material to a coarse sluice box (not shown) according to one embodiment of the invention.

That is, in processing larger quantities of placer ore it is highly desirable to separate the coarsest materials to be processed in the sluice from the finest materials. This can be achieved with the side trommel 100 fine sluice box 150. Once the fine material is sluiced, the waste thereof rejoins the coarse material that emerges out of the end of the side trommel 100 at a lower stilling plate 171, as illustrated in FIGS. 14 and 15.

The main channel 168 of the fine sluice box 150 is illustrated in FIG. 7 and is comprised of a first plurality of vertically offset landings 152, 154 and 156 in a first flight of landings, a lower stilling plate 171, and a second plurality of vertically offset landings 182, 184, 186 and 188 in a second flight of landings. Each plurality or series of vertically offset steps or landings 152-158 and 182-188 in each flight is arranged in a cascade. Each step is comprised of a landing and a lip overhanging the landing. The slurry of material that passes through the fine mesh screen 172 flows through the main channel 168 of the sluice box 150 and cascades downwardly from each landing to the landing below. Each of the landings above the lowermost landing 188 terminates in a lip 160 that overhangs the landing below. The lighter material in the slurry is discharged from the lower extremity of the sluice box 150 as fine tailings where indicated at 162, while the heavy materials are trapped on the landings 152-158 and 182-188.

To aid in holding particles of heavy metal, such as gold, the sluice box landings are provided with sections of matting 161 and sections of screens located thereatop. The landings 152-156 in the first flight are provided with sections 192 of expanded metal screens having a cross section depicted in detail in FIG. 8. The expanded metal screen sections 192 are formed from lengths of wire welded together into a mesh. Each length of wire undulates at an angle of forty five degrees relative to the horizontal. The structure of the screen sections 192 is defined with a multiplicity of openings 194. The openings 194 in the screen section 192 have dimensions of three-quarters of an inch by one-half of an inch and are diamond-shaped when viewed from above.

The landings 182-188 in the second flight of landings are likewise provided with expanded metal screen sections 196 which have larger diamond-shaped openings measuring one and three-quarters of an inch by three-quarters of an inch. The configurations of the openings 194 in the screen sections 196 are illustrated in plan view in FIG. 2. The cross section of the screen sections 196 is identical to that depicted in FIG. 8. The only difference between the screen sections 192 and 196 is the size of the openings 194 therein.

Beneath the screen sections 192 and 196 there are sections of ribbed felt mats 161. The mat sections 161 are merely formed of strips of felt carpeting. The ribs on the mats 161 are oriented to extend transverse to the direction of slurry flow and project upwardly beneath the screen sections 192 and 196.

Along the upper edges of the sides of the fine sluice box 150 there are a number of mounting tabs 164 that project laterally inwardly over the various landings. These mounting tabs 164 are tapped to receive mounting screws 166. The mounting screws 166 have thumb screws which can be adjusted to bear downwardly and hold the screens sections 192 and 196 and the mat sections 161 in place on the landings 152-158 and 182-188. As the slurry of fine material in water flows across the landings 152-158, vortexes are created beneath the ridges formed by the screen sections 192. These vortexes aid in trapping the extremely fine particles of heavy material metals, such as gold. Also, the screen openings 194 aid in allowing the very tiny particles to be trapped atop the mat sections 161 and beneath the screen sections 192, while larger sand particles are carried along and discharged with the light tailings 162.

The first flight of landings 152-158 are located within the upper half of the main channel 168 of the sluice 150. Thus, the fine particles of gold which pass through the screen mesh 172 of side trommel 100 are directed along a path that is initially separate from the path of the coarse particles that cannot pass through the side trommel 100. Virtually all of the fine particles of gold of a mesh size of between 250 and 500 are collected on the landings 152-158.

The coarser particles of material received from the upper end 13 of the outer drum 12 flow through the side trommel 100 and then are directed back into the fine particle slurry that has been stripped of its fine valuables. Since virtually all of the fine particles of gold are collected in fine sluice box 150, the coarser particles are mixed with the waste fine slurry to improve the flow dynamics of the coarse materials.

The reasons for separating the coarse heavy particles from the fine heavy particles with the screen 172 is because a flow of coarse and fine particles together is likely to result in the loss of the fine particles. This is because the coarse particles, as they flow downstream, tend to create a vortex in their wake. This turbulent vortex tends to prevent the very fine particles of gold from settling out on the flights of the sluice. To the contrary, the lighter particles would be sucked along in the turbulent wake of the coarser particles and would thus be lost. By separating the coarse particles from the fine particles for processing in the sluice 150, the fine particles are not subjected to the turbulent effects created by the downstream travel of the coarser particles and instead are trapped in the upper flights 152-158 of the main channel 168 of the sluice 150. The separation of the coarser particles from the finest particles by means of the screen 172 significantly increases the efficiency of collection of the fine particles of gold.

This admixture of fine and coarse material is then sent down through a coarse sluice box 158. The combined fine and coarse slurry thus aids the flow of the coarse materials, which without the fine slurry component would not sluice as effectively and would even clog up under many typical conditions. The advantage comes in part from the two-fold fact that the fine valuables are removed in the fine sluice box 150 in the absence of the coarser material, because otherwise the turbulence created by the movement of the coarse material would interfere with fine valuables collection. Then, the fine waste is reintroduced and combined with the coarse materials to assist in the collection of the coarse valuables in the coarse sluice box 158, because otherwise the coarse materials would not by itself effectively move through the coarse sluice box 158.

Implementation of the Method

In the practice of the method of the invention the placer recovery apparatus 10 is towed behind a truck or other heavy vehicle by means of the tongue 46 and the tow hitch 48 to a placer ore site. The apparatus 10 rolls easily on the rubber tired wheels 44, even over very poor roads.

Once the apparatus 10 has arrived at the job site, the rear legs 49 are lowered and locked in position so that the supporting framework 20 is stabilized and so that the transversely extending members thereof are substantially horizontally aligned. The front leg 50 is then deployed by means of the crank 52 so as to tilt the apparatus rearwardly to an angle of inclination A, which typically is between about two degrees and fifteen degrees relative to horizontal. Adjustment of the front leg 50 to tilt the axis of rotation of the outer drum 12 and the inner barrel 11 at an angle of about eight degrees is typical for many consistencies of placer ore.

The water pump hose is coupled to the coupling 121 and the water pump intake is immersed in a large water supply, such as a river or lake. The apparatus 10 is located as close as possible to water level, so as to minimize the load on the water pump. The gasoline engine 74 is thereupon started. The engine 74 drives the engine drive shaft and the power take off shaft 70 in rotation to turn the drive pulley 76. The engine may also be used to operate the water pump, or the water pump may be independently powered. In either case water is pumped through the coupling 121 into the water intake manifold 122 and from there through the valves 124, 126, 129 and 132 to the wash water hose 123, the spray bar supply hose 125, the sluice water supply hose 128, and the hopper water supply hose 131. The valves 124, 126, 129 and 132 are adjusted as appropriate.

With the engine 74 in operation, the outer cylindrical drum 12 is driven in counter-clockwise rotation, as viewed in FIGS. 3 and 4 at a first angular velocity of perhaps five revolutions per minute by means of the drive belt 66. Concurrently, the drive belt 140 turns the inner hollow barrel 11, also in a counter-clockwise direction, at a second, higher speed of perhaps about twenty six revolutions per minute. The water supply manifold 122 draws an intake of no greater than five hundred gallons of water per minute and dispenses the water through the nozzles 137 and 176, the sluice water supply line 128 and the spray bar 134.

Placer ore is then loaded into the hopper 33 from the chute 178 at a volume of approximately one hundred twenty cubic yards per hour. The coarse placer ore enters the cylindrical inner barrel 11 through the chute 34 in a flow indicated at 200 in FIG. 5. As the placer ore enters the fragmentation section 90 of the inner barrel 11, the longitudinal vanes 92 carry the ore upwardly toward the top of the inner barrel 11, and drop the ore to the bottom thereof, thereby breaking up agglomerations and aggregations into smaller pieces.

The ore reaches a first level 114 within the fragmentation section 90, and then flows over the lip 98 into the trommel section 92 of the inner barrel 11. The ore is likewise carried upwardly in rotation by the vanes 102 in the trommel section 92 and dropped to the bottom thereof, thereby aiding in further fragmentation. Also, particles of the size of one-quarter of an inch and smaller pass through the perforations 106 in the trommel section 92 and pass radially outwardly from the inner barrel 11 into the outer drum 12. Similarly, even larger particles of up to one and three quarter inches in dimension pass through the apertures 108 and likewise are discharged into the outer drum 12. The very large chunks of material that remain in the inner barrel 11 pass into the discharge section 94 and are ultimately discharged. These larger, lighter stones are discharged as light, coarse tailings as indicated at 118.

Due to the presence of the annular end lip 112, large, heavy material will tend to remain trapped within the discharge section 94, as that heavy material will normally reside beneath the level 120. The discharge section 94 is periodically checked for the presence of gold nuggets, which can be removed and added to the finer gold dust recovered from the sluice box 150.

The material that passes from the trommel section 92 into the outer cylindrical drum 12 is acted upon by the spiral vane 18 that serves as a reverse spiral or screw. That is, as the inner barrel 11 and outer drum 12 rotate in the same direction but at their respective speeds, and as tailing material passes through the inner barrel 11 from left to right, as viewed in FIG. 5, the finer material entrained in a slurry and entrapped within the outer drum 12 is acted upon by the reverse spiral action of the vane 18. The heavier particles of this material tend to sink rapidly toward the interior concave surface 16 of the interior cylindrical wall, both due to the force of gravity and due to centrifugal action created by rotation of the outer cylindrical drum 12. This heavier material will thereby tend to lie beneath the slurry level, indicated at 202 in FIG. 5, which is within one and one-half inches of the surface of the interior cylindrical wall 16. This heavier material is thereby forced back forwardly and upwardly from the lower end of the outer drum 12 toward the upper end thereof by virtue of the screw action of the reverse spiral vane 18.

An additional material is loaded into the hopper 33, there is a tendency for surging which tends to act in opposition to the force of the reverse spiral vane 18 and to carry material out of the lower end of the outer drum 12. However, the frusto-conical annular extension 15 from the radially inwardly directed lip 14, and the reverse spiral vane 17 thereon, serve to counter this surging effect. This keeps the heavier particles within the outer drum 12 and prevents them from being carried out as fine tailings 19. The lighter material, on the other hand, is discharged as fine tailings 19

The mechanism for vibrating the outer drum 12 aids in separating fine, heavy material in the outer drum 12 in the concentration process The oscillating moment created by the rotation of the eccentric disk 84 causes the floating framework 21 to oscillate and vibrate relative to the stabilized framework 20. This vibration is transmitted to the outer drum 12 through the brackets 40 and rollers 39. This vibration action tends to dislodge the solid material from the interior wall surface 16 of the outer drum so that this solid material drops back into the liquid slurry 202, where it is subjected to the screw action of the vane 18.

Since the oscillatory force is applied beneath the left-hand side of the outer drum 12, as viewed in FIG. 4, the dislodging affect of vibration is greatest on the right-hand side of the outer drum 12. The right-hand side is where the material will tend to cling to the wall surface 16 as the wall surface rotates counter-clockwise through the slurry 202.

The fall of material back into the slurry 202 from the cylindrical wall surface 16 aids in separating agglomerated particles as well, so that the separated lighter material is carried away in the downstream water flow over the spiral vane 18, and over the spiral vane 17 in the extension 15. The light solid material is thereby largely discarded in the tailings 19. This leaves only the very heaviest solid material to be pushed up the spiral incline by the spiral vane 18. Thus, only the very heaviest of this material is discharged into the trough 146. With an ore input into the hopper 33 at the rate of one hundred twenty yards per hour, only about two cubic yards per hour of solid material are discharged into the trough 146 for processing by the sluice box 150.

With ore being processed from the hopper 33 at the rate of one hundred twenty cubic yards per hour, approximately twenty cubic yards of large, light tailings 118 are discharged per hour from the discharge section 94 of the inner barrel 11, while approximately ninety eight cubic yards of fine light tailings 19 are discharged from the extension 15 of the outer cylindrical drum 12. At least 95% of the ore processed is discharged as tailings 118 and 19 and does not reach the sluice box 150.

The remaining material is carried by the reverse spiral action of the vane 18 from right to left, as viewed in FIG. 5, and ejected from the upper end of the outer drum 12 into the trough 146. This discharge from the upper end of the outer drum 12 flows through the trough 146 to the sluice box 150. The fine, heavy material that is carried from the trough 146 falls through the screen 172 into the upper stilling plate 151 of the main channel 168 of the sluice box 150 then travels down the first flight of steps 152-156, where the heaviest of this fine material is entrapped beneath the screens 192 atop the mats 161.

Unlike prior systems, extremely fine particles of gold and other very heavy metals and minerals are entrapped in the main channel 168 of the sluice box 150. The vortex action created by the overhanging lips 160 at each landing, and the vortex action created by the screens 192 aid in this connection. Particulates of gold as small as 500 mesh are consistently trapped in the sluice box 150, and significant quantities of particulates as small as 1300 mesh have been recovered.

The particles of solid material in the trough 146 which are greater in size than 250 mesh cannot drop through the screen 172, but are carried beyond the main channel 168 to the upper end of the bypass channel 169. There the slurry of these larger particles flows down the inclined bypass channel 169 parallel to the upper portion of the main channel 168. The bypass channel 169 joins the main channel 168 at the lower stilling plate 171. By this time virtually all of the very fine particles of gold have been trapped upstream from the lower stilling plate 171 by the steps 152-156.

The flow of the coarser, heavy particles continues down the lower portion of the main channel 168 over the steps 182-188, where the larger, coarser particles of gold are trapped beneath the screens 196 atop the mat sections 161. The less dense, lighter solid material is carried in a slurry and is discharged as a very fine tailing 162, consisting mostly of very fine sand.

The water that is introduced with the ore at the hopper 33 by means of the nozzle 176 not only carries the placer ore in a slurry from the upper to the lower end of the inner barrel 11, but also to a large extent passes radially outwardly through the trommel section 92 into the outer drum 12. There, the flow of a good portion of this water is reversed, as it is carried up the spiral incline by the rotating vane 18.

Likewise, the water introduced into the trommel section 92 by means of the spray from the nozzle 137 which is used to wash fine material from heavier rocks and gravel is likewise reused in the outer drum 12. Thus, a considerable portion of the water used in the initial stages for washing the larger rocks and gravel is reused to carry the same material in a slurry into the trough 146. The water is augmented with water from the water lines 125 and 128 to provide sufficient water to carry away the fine tailings through the sluice box 150. Nevertheless, far less water is required to process given quantities of placer ore than is the case with prior devices.

Once the slurry of heavy, fine material is discharged through the screen 172 at the lower end of the trough 146 into the main channel 168 of the sluice box 150, the lighter material is carried downstream and discharged in the fine tailings 162. Meanwhile, tiny flakes of gold settle onto the landings 152-156 beneath the screens 192 and atop the mats 161. Because the fine material is so concentrated by the time it reaches the trough 146, very little water flow is required to carry away sand and other light materials in the light tailings 162. This reduced water flow through the sluice box 150 allows a very, very large portion of the extremely fine gold particulates to settle on the landings 152-156. Indeed, virtually all of the gold having a particle size between 250 mesh and 500 mesh is recovered from the first two landings 152 and 154. The efficiency of gold recovery with the system of the invention is approximately ninety five percent, and the efficiency does not drop as placer ore is processed through the system.

The minimal flow of water through the system also aids in suppressing surging through the sluice. In conventional systems a slurry surge passes through the system with each volume of placer ore introduced into the processing equipment. However, due to the low water consumption and the reversal of direction of the flow of slurry to be processed by the sluice box 150 in the outer drum 12, the sluice box 150 is virtually free of surge effects. Consequently, unlike conventional systems, fine particles of gold are not washed away by surges with the fine tailings 162.

Undoubtedly, numerous variations and modifications of the invention will become readily apparent to those familiar with placer recovery of gold and heavy metals and minerals. It is readily apparent that the various dimensions of the outer drum, the inner barrel, the sections of the inner barrel, and the sluice can all be varied, depending upon the volume of placer ore to be processed. Similarly, the angle of inclination of the axes of the outer drum 12 an the inner drum 13 can be altered to optimize efficiency of recovery from ores of different composition.

While the present invention has been described with regards to particular embodiments, it is recognized that additional variations of the present invention may be devised without departing from the inventive concept.

What is claimed is:

1. A process for separating heavy metals from ore using an outer hollow cylindrical drum inclined relative to horizontal to define upper and lower ends and having at least one spiral vane extending inwardly from said outer drum's inner wall and radially extending lip at said lower end, an inner cylindrical barrel located within said outer drum and inclined relative to said outer drum, and at least one sluice box having upper and lower ends operatively coupled to said outer drum, comprising the steps of:

rotating said outer drum at a first speed in a direction such that said spiral vane urges material therein toward said upper end of said outer drum and toward said upper end of said at least one sluice box, wherein the spiral vane is divided into a first section, second section, and third section, wherein the third section comprises a single height and the first section comprises generally a double height, and wherein a pitch of the third section is less than a pitch of the first and second sections rotating said inner barrel at a second speed greater than said first speed, directing discharge from said upper end of said outer drum as an input into said sluice box, and directing a spray of water into a trommel section of said inner barrel.

2. A process according to claim 1 further comprising directing water onto said inner wall of said outer drum.

3. A process according to claim 1 further comprising rotating said outer drum at a speed of between about four and eight revolutions per minute and said inner barrel at a speed of between about thirty and forty revolutions per minute.

4. A process according to claim 1 further comprising applying vibrations to said outer drum.

5. A process according to claim 1, further comprising supplying a flow of water to said sluice box and further comprising supplying ore to said inner barrel at a rate of between about one half cubic yard per hour and about three hundred cubic yards per hour and directing the flow of water into said outer drum, said inner barrel and into said sluice box at a rate less than five hundred gallons per minute.

6. A process according to claim 1 further comprising screening said discharge from said upper end of said outer drum to separate coarse solids from fine solids, passing said fine solids directly into said upper end of said sluice box, and passing said coarse solids into said sluice box at a point below said upper end thereof.

7. A process according to claim 1 further comprising screening said discharge from said upper end of said outer drum to separate solids therein into a discharge portion containing entrained fine solids and a discharge portion containing entrained coarser solids and passing said discharge portion containing fine solids into said upper end of said sluice box and introducing said discharge portion containing said coarser solids into said sluice box downstream from said upper end thereof, whereby said coarser solids bypass said upper end of said sluice box.

8. The process according to claim 1, wherein the second section comprises generally a double height.

9. The process according to claim 1, wherein the at least one spiral vane has a circular cross section.

10. The process according to claim 1, wherein the pitch of the first section and the second section are between forty-five and fifty inches and the pitch of the third section is between twenty-four and forty inches.

11. The process according to claim 1 further comprising supplying ore to a hopper and a grizzly and filtering oversized material.

12. The process according to claim 11, wherein the grizzly comprises a plurality of bars configured to vibrate in order to speed up the filtering process.

13. The process according to claim 11 further comprising supplying a flow of water to the hopper to separate fine solids from the ore before removing the oversized material.

14. The process according to claim 1, wherein the at least one sluice box comprises a first sluice box for fine solids and a second sluice box for coarse solids.

15. The process according to claim 14 further comprising screening the discharge from the upper end of said outer drum to separate coarse solids from fine solids, passing the fine solids into the first sluice box and the coarse solids into the second sluice box, and directing discharge of the first sluice box as an input into the second sluice box.

16. The process according to claim 15, wherein screening the discharge is performed by applying a quarter inch minus screen.

* * * * *